United States Patent
Richardson et al.

[11] 3,978,588
[45] Sept. 7, 1976

[54] MAGNETIC WIRE LINE MARKING, ERASING AND DETECTING METHOD AND APPARATUS

[76] Inventors: Robert L. Richardson, 536 E. Thompson Blvd., Ventura, Calif. 93001; Norris Johnston, 4222 Thacher Road, Ojai, Calif. 93023

[22] Filed: Aug. 6, 1973

[21] Appl. No.: 385,671

Related U.S. Application Data

[63] Continuation of Ser. No. 159,507, July 2, 1971, which is a continuation-in-part of Ser. No. 2,184, Jan. 12, 1970, abandoned.

[52] U.S. Cl. .......................... 33/126.5; 324/34 PS; 340/282; 346/33 WL; 360/1
[51] Int. Cl.² ..................... G08B 21/00; G01R 1/16
[58] Field of Search ................ 33/127, 136, 137 R, 33/125 R, 126, 126.5; 324/34 PS, 34 R, 34 L; 340/174.1 L, 282; 346/33 WL; 360/1

[56] References Cited
UNITED STATES PATENTS

| | | | |
|---|---|---|---|
| 2,655,633 | 10/1953 | Minor et al. | 324/34 |
| 2,753,832 | 7/1956 | Tinsley | 33/126.5 |
| 2,806,372 | 9/1957 | Arps | 73/151.5 |
| 3,066,253 | 11/1962 | Bowers | 324/34 |
| 3,150,358 | 9/1964 | Newman et al. | 340/174.1 |
| 3,303,483 | 2/1967 | Rabinow | 340/174.1 |
| 3,368,208 | 2/1968 | Lippmann et al. | 340/174.1 |
| 3,466,535 | 9/1969 | Sterns et al. | 324/34 |
| 3,541,573 | 11/1970 | Ault et al. | 346/74 |

*Primary Examiner*—Richard E. Aegerter
*Assistant Examiner*—John W. Shepperd
*Attorney, Agent, or Firm*—Harris, Kern, Wallen & Tinsley

[57] ABSTRACT

A method and apparatus for providing a signal when equipment being run into or out of a well on a magnetizable wire line reaches a previously visited point in the well below the surface. With the equipment at the point in the well to be revisited, a magnetic mark is applied on the wire line at an appropriate spot at the surface. The magnetic mark may be of one or more dipoles and in the case of three or more dipoles they are arranged in close proximity along the length of the wire line with alternately opposite polarities and on a common axis of polarity, with said axis substantially paralleling the length of the wire line. Subsequently, in running the equipment in or out, at least one of the magnetic dipoles is detected at the same appropriate spot at the surface and is used to actuate a signaling device. In the case of a multiple dipole magnetic mark, the alternating opposite polarity of the dipoles causes the end dipoles to resist the weakening of the central dipole, or dipoles, which would otherwise diminish in strength with time due to the spreading of magnetic energy along the magnetically soft wire line.

1 Claim, 3 Drawing Figures

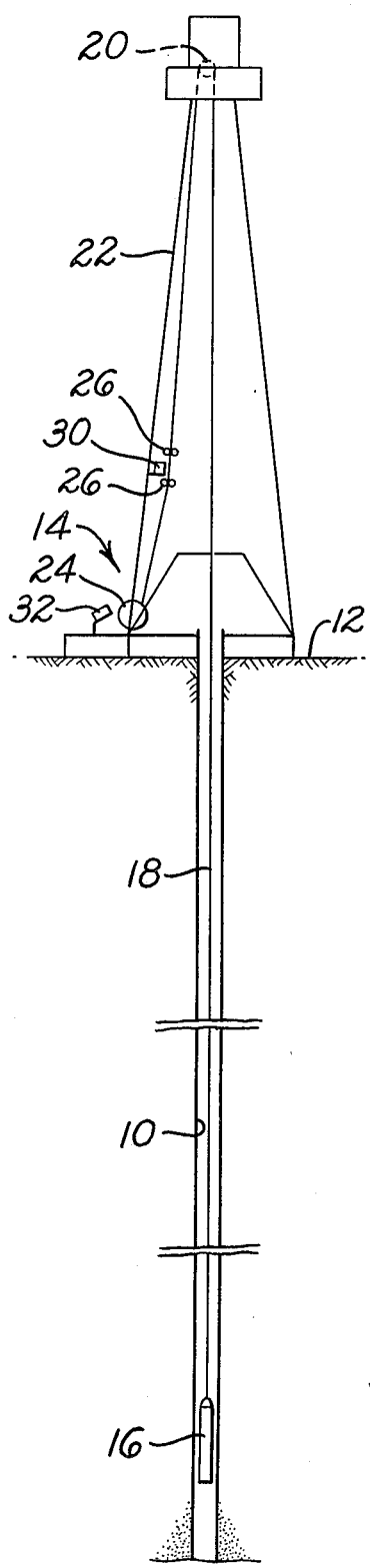
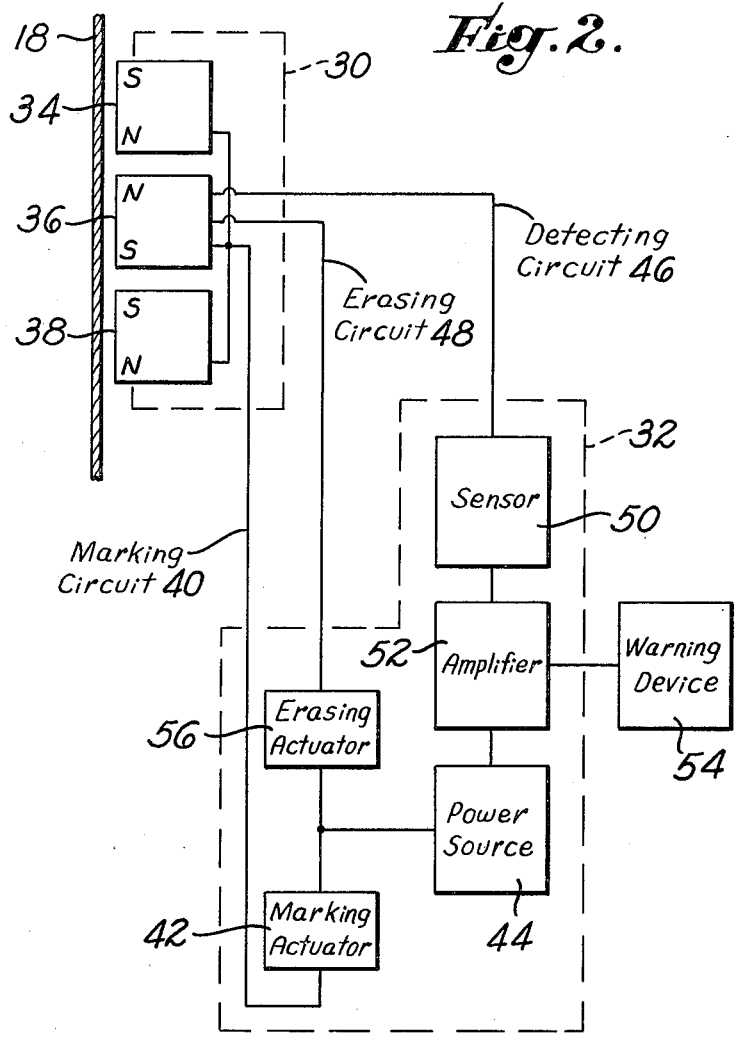
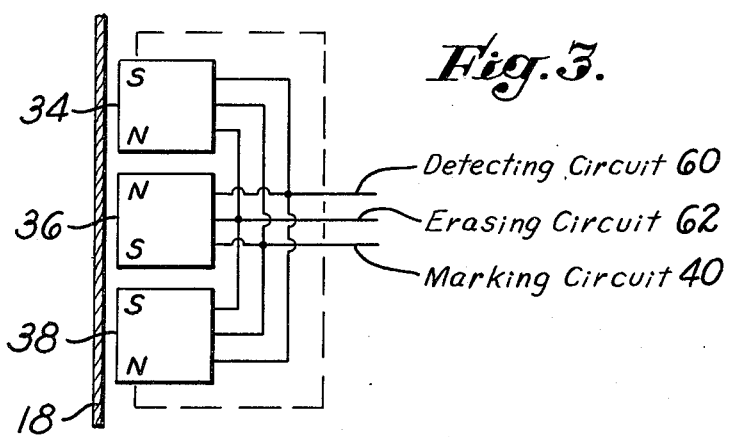

MAGNETIC WIRE LINE MARKING, ERASING AND DETECTING METHOD AND APPARATUS

CROSS REFERENCE TO RELATED APPLICATION

This application is a continuation of Ser. No. 159,507 filed July 2, 1971; and which is a continuation-in-part of Ser. No. 02,184, filed Jan. 12, 1970, now abandoned.

BACKGROUND OF INVENTION

The present invention relates in general to a method of and apparatus for providing a signal upon the arrival at a previously visited point in a well of equipment being run into or out of the well on a wire line. Such equipment may be used in drilling operations, production operations, remedial operations, or the like. Wire line operations in wells, particularly in the oil industry, are well known so that specific examples are unnecessary.

In running equipment in and out of a well on a wire line it is frequently desirable to be able to return to, or revisit, a given point in the well; the finite distance, or depth of the point, being immaterial to the repeated revisiting of the equipment to the point. The prevailing practice is to place a visible marker, commonly called a "flag" and hereinafter referred to as a "flag", on the wire line at an appropriate spot at the surface in the general area around the top of the well, hereinafter referred to as the "well head", when the wire line suspended equipment is at its operating position in the well. During subsequent trips into the well the flag provides a visual indication at the well head when the equipment has been returned to its operating position. Such a flag, when used on multi-strand wire lines is frequently a rag, leather straps, or pieces of rope tucked between strands of the wire line; or a piece of tape when used on single strand, or "piano wire", wire lines.

Similar procedures are followed in running equipment in and out of a well to avoid too high a running speed as the equipment reaches its destination so as to prevent possible damage to the equipment, the well installation and/or injury to personnel. The flag is visually detected at the well head by the operator in running the equipment in or out of the well and the running speed is reduced in anticipation of the arrival of the equipment at its destination.

As work progresses in a well, the attainment of greater depth in a drilling well, the lowering of the fluid level in a well being swabbed, or the reduction of fill in a well being bailed as examples; it is necessary to remove the previously placed flag and to establish a new point of reference on the wire line by placement of a new flag at a new point on the wire line. It is the preferred and accepted practice that the wire line not contain more than one flag at any one time so that there can be no question as to which flag is the "working marker", or "working flag". Often there will be as many as ten, or in a drilling well, several hundred changes of location necessary for the flag as the work progresses. In each instance it is required that the operation be shut down while the previous flag is removed, and again when the new flag is applied. In the case of multi-strand wire lines, mechanical separation of the wire line strands is required to either remove or insert the flag.

The foregoing practice has various disadvantages. For example, the application and removal of flags are time consuming and require physical exposure of personnel to the inherent dangers of wire line operations. The manually placed flags are subject to displacement along the cable and/or actual loss while running the equipment in or out of the well, or in using it to carry out its intended operation. The forcible spreading of the wire line strands of a multi-strand wire line in order to insert flags also results in abnormally stressing the wire line at the point of placing a flag. Further, visual detection of a flag requires a reduced speed in running in or out in anticipation of the arrival of the flag, which is time consuming. These and various other disadvantages of flags are avoided by the present invention, as will now be discussed.

SUMMARY AND OBJECTS OF INVENTION

With the foregoing background in mind, the primary object of the invention is to apply a magnetic mark or "magnetic flag" to the wire line at the well head when equipment suspended on the wire line is at a point in the well which point is to be revisited, and subsequently to utilize the magnetic mark to actuate a suitable signaling means or device to indicate the return of the equipment to the previously visited point in the well when running the equipment into or out of the well, as the case may be, and to selectively erase and relocate said magnetic mark as necessary and required by operations in the well.

As stated, the primary object of the invention is to provide a magnetic mark or "magnetic flag" for use in wire line operations on wells. The accomplishment of this object in its simplest form is the placement of a single dipole magnetic mark on the wire line or other magnetizable material, i.e., a mark impressed by a single coil magnetic head wherein the resulting mark consists of one north pole and one south pole, a single dipole, and the primary function and design as well as an important object of the invention is to provide this single dipole type of magnetic mark.

Notwithstanding the above, it is recognized that such a single dipole magnetic mark may be subject to weakening of its magnetic strength and concentration with time, such weakening resulting from the diffusion of the magnetism along the magnetically soft wire line or other magnetizable material on which it is impressed, and/or under certain circumstances a single dipole magnetic mark may not be distinguishable from an extraneously magnetized point. The life of a single dipole magnetic mark is dependent upon its original strength as well as the nature of the magnetizable material on which it is impressed. Where a magnetic mark of a more or less permanent nature is required, or where extraneously magnetized points may require a strong magnetic flag or recognizable distinguishing features, an embodiment of the invention provides a multiple dipole magnetic mark. The multiple dipole magnetic mark consists of at least three magnetic dipoles arranged in series in close proximity along the length of the wire line with alternating opposite polarities and on a common axis of polarity with said axis substantially paralleling the length of the wire line, at least one of the magnetic marks being detected to actuate the signaling device.

Such use of at least three adjacent magnetic dipoles of alternating opposite polarities provides a "guarded mark" resulting from the reversed polarity of the end dipoles which repulse the opposite polarity of the adjacent central dipole preventing free diffusion with time of the magnetic energy of the central dipole along the wire line, thereby maintaining at a maximum the magnetic strength and the magnetic life of the central dipole. Consequently, this dipole arrangement minimizes any possibility of failure to actuate the detecting system upon arrival of the marked portion of the wire line at the detector at the well head, and also lengthens the useful life of the magnetic mark, which are important features of the invention.

The detection of the magnetic mark is preferred to be by detecting only one magnetic dipole even though the magnetic mark may consist of one or more dipoles. Alternatively, however, all dipoles of a multiple dipole may be detected simultaneously by a multiple detection device so as to further provide a recognizable magnetic mark less likely to be confused with an extraneously magnetized point on the wire line, which is an important feature of the invention.

A further refinement of detecting the magnetic mark is to detect the several dipoles comprising a multiple dipole mark in a sequential manner with a single detector, again providing a recognizable magnetic mark which would be clearly distinguishable from an extraneously magnetized point on the wire line, which is an important feature of the invention.

Other configurations of multiple magnetic marks along a common axis of polarity (each being of one or more dipoles) in close proximity one to another are possible, as is their simultaneous or sequential detection by multiple detectors or single detectors and all such configurations are important features of the invention.

Another object of the invention is to erase from the wire line any extraneously magnetized points which may be present thereon and/or to selectively erase any applied magnetic marks. It is essential in wire line operations that there be only a single working mark on the line, and it is further necessary that such working mark be relocated from time to time. A previously imposed mark can be erased when it is desired, in the course of operations, to remove such mark and impose a new mark at another point on the wire line, which is an important feature of the invention.

As will be apparent from the foregoing, the present invention provides a way of marking a particular point on a wire line and of subsequently automatically recalling the same point when desired, with the added capability of erasing any previously applied mark or marks no longer to be used. The invention is thus concerned not with measurement of any particular point to point distance, but solely with accurate recall of a specific point, or combination of points, with the ability to erase and relocate same as required by changing circumstances. As previously indicated, the invention is particularly applicable to oil well operations, but may also be used for other purposes.

The foregoing objects, advantages, features, and results of the present invention, together with various other objects, advantages, features and results thereof which will be evident to those skilled in the wire line art in the light of this disclosure, may be achieved with the exemplary embodiments of the invention described in detail hereinafter and illustrated in the accompanying drawing.

DESCRIPTION OF DRAWING

In the drawing:

FIG. 1 is a diagrammatic view illustrating the present invention in use in a well;

FIG. 2 is a diagrammatic view showing one embodiment of the invention; and

FIG. 3 is a diagrammatic view showing another embodiment thereof.

DESCRIPTION OF EXEMPLARY EMBODIMENTS OF INVENTION

For convenience, exemplary embodiments of the invention will be considered in connection with running equipment into a well. These same embodiments may also be used to practice the invention when running equipment out of the well. When used in running equipment in, the invention signals the arrival of the equipment at the point to be revisited in the well.

Turning now to the drawing, FIG. 1 thereof illustrates diagrammatically a well 10, such as an oil well, drilled into the ground from the surface 12. The well head or well head area is designated generally by the numeral 14. Suitable equipment 16 is suspended in the well 10 on a magnetizable wire line 18 of any desired type. In the particular construction illustrated, the wire line 18 is trained over a crown block 20 on a fixed derrick 22 and then extends downwardly to a sand line reel 24. Although a fixed derrick 22 is shown it will be understood that a portable mast may be substituted if desired, and likewise a portable or mobile hoist may be substituted.

In the well head area 14, the wire line 18 passes between spaced pairs 26 of idler pulleys which stabilize the length of wire line therebetween. The pulleys of each pair may be spring biased toward each other. Preferably, the pairs 26 of pulleys are located on the wire line run from the crown block 20 to the sand line reel 24 to avoid obstructing the portion of the well head area 14 directly above the well. However, under preferred circumstances the mounting may be directly over the well, and the mounting may have a circumferential configuration encircling the wire line.

The invention comprises a magnetizing, detecting and erasing means 30 in close proximity to the wire line 12 intermediate the pairs 26 of pulleys, and a control console 32 at a suitable remote location. These are interconnected as shown in FIG. 2 and as will be described.

The magnetizing, detecting, and erasing means 30 is essentially a single magnetic head made up of a single electrically coiled yoke of magnetic material, or other means of impressing a magnetic mark; which, through means contained in the control console 32, is selectively capable of impressing, detecting, and/or erasing a magnetic mark on the wire line 18. As described, this head would be the central head 36, as illustrated in FIG. 2, which head alone is connected to all three circuits, the marking circuit 40, detection circuit 46 and erasing circuit 48, and is alone capable of performing the necessary magnetic marking, detecting, and erasing function of the magnetizing, detecting, and erasing means, and in the simplest embodiment here being described would not be accompanied, as shown in the embodiment illustrated, by the adjacent magnetic heads 34 and 38.

In the embodiment illustrated in FIG. 2, two additional magnetic heads are shown, one, 34, above and one, 38, below the primary head 36. These additional heads 34 and 38 provide the multiple head configuration necessary to achieve a magnetic mark consisting of three magnetic dipoles of opposite polarity, the two outer dipoles serving to reinforce or guard the central or primary dipole for maintenance of greater stength and longer life to the magnetic mark. In this embodiment, heads 34 and 38 are not required for detection or erasing of magnetic marks and are not connected into the detection circuit 46 or erasing circuit 48. The individual heads 34, 36, and 38 are located relatively close together and in close proximity to the wire line 18, the latter being virtually in sliding contact with the heads. It will be understood that each of the heads 34, 36, and 38 is of the same or similar construction and comprises basically a single electrically coiled yoke of magnetic material or other means of impressing a magnetic mark. Since such heads are well known, a further description is not necessary.

An important feature of the present invention is that the three heads 34, 36, and 38 are of alternately opposite polarities, as indicated in FIG. 2. For example, the head 34 may have a S-N orientation, the head 36 a N-S orientation and the head 38 a S-N orientation. It will be understood that, when the heads 34, 36, and 38 are actuated to magnetically mark the wire line 18, they will apply to or impress on the wire line three spaced magnetic dipoles of alternately opposite polarities along a common axis of polarity, said axis being substantilly parallel to the length of the wire line.

The three heads 34, 36, and 38 are all connected in a marking circuit 40 which includes a marking actuator 42 and a power source 44. Manual operation of the marking actuator 42 results in impressing on the wire line 18 a magnetic mark consisting of three dipoles of alternately opposite polarities. (In the simplest form only the magnetizing head 36 would be present and a single dipole magnetic mark would be impressed.)

In the embodiment illustrated in FIG. 2, detection and erasing circuits 46 and 48 are connected to the center head 36 only. The detecting circuit 46 includes a sensor 50, an amplifier 52, and the power source 44. A suitable signaling device or means 54 is connected to the amplifier 52 and is actuatable by the sensor 50 when the center head 36 detects a magnetic dipole on the wire line 18. The signaling device 54 may be a light, a horn, or the like.

The erasing circuit 48 includes an erasing actuator 56 interconnecting the center head 36 and the power source 44.

Considering the operation of the embodiment of the invention illustrated in FIGS. 1 and 2 of the drawing, the equipment 16 is lowered into the well 10 on the wire line 18 to a point in the well, which point is desired to be revisited on a subsequent running of the tools.

Then, the marking actuator 42 is operated to cause the three magnetizing heads 34, 36, and 38 to apply to the wire line 18 a magnetic mark consisting of three dipoles of alternately opposite polarities spaced apart along the wire line. (In the simplest form only the magnetizing head 36 would be present and a single dipole magnetic mark would be impressed.) The impressing of the magnetic mark on the wire line 18 is preferably done while the equipment 16 is stationary, i.e., while the wire line is stopped.

Before and after operating the marking actuator 42, the erasing actuator 56 may be actuated to remove from the wire line 18 any magnetic markings thereon, whether applied by one or more of the magnetizing heads 34, 36, and 38 or otherwise. The erasing of magnetic marks, applied or otherwise, is done while the wire line 18 is in motion. Thus, any extraneous magnetic marks on the wire line 18 are removed so that they will not later provide unwanted actuation of the signaling device 54.

After the equipment 16 has carried out its function in its operating position in the well 10, it is withdrawn upwardly in the well by the wire line 18. Subsequently, when the equipment is again run into the well, the magnetic mark consisting of three dipoles of alternately opposite polarities which were applied by the three heads 34, 36, and 38 (or in its simplest form the single dipole applied by the single head 36) arrives at the well head 14. When it does, at least one of the dipoles is detected by the detecting circuit 46 in which the head 36 is connected. Impressing three magnetic dipoles of alternately opposite polarities on the wire line 18 insures that at least the "guarded" or protected middle dipole will be of sufficient strength to be sensed by the detecting circuit 46. When it is, the detecting circuit actuates the warning device 54, which provides the operator with an indication that the equipment 16 is again at the previously visited point in the well.

In the embodiment hereinbefore described, the detecting circuit 46 includes only the head 36, so that only one magnetic mark needs to be detected to trigger the signaling device 54. If the virtual elimination of any possibility of triggering the signaling device 54 by some extraneous magnetic mark is desired, this may be accomplished by connecting all three of the heads 34, 36, and 38 in a detecting circuit 60, as shown in FIG. 3. With this detecting circuit, the signal device will not be actuated until the three magnetic dipoles previously applied to the wire line 18 register with the respective heads 34, 36, and 38. If desired, all three heads may also be connected in an erasing circuit 62 so that each head shall have the capability of performing each of the three functions: marking, detecting, and erasing.

It will be apparent that the embodiments disclosed may be used in a similar, but reversed, manner in making repeated trips into the well 10 with the equipment 16. In this instance, one or more of the magnetic dipoles signals the impending arrival of the equipment at the surface.

Also, while the magnetic marks are preferably applied to the wire line with the equipment suspended in the well for convenience, they may also be applied with the equipment out of the well if desired.

Although exemplary embodiments of the invention have been disclosed for illustrative purposes, it will be understood that various other embodiments are possible.

We claim as our invention:
1. A method of relocating equipment at a previously visited point in a well, the equipment being run on a magnetizable wire line, including the steps of:
   locating the equipment on the wire line at a desired point in the well;
   while the equipment is at the desired point, applying three magnetic dipoles of alternating polarity in a closely spaced line to the wire line at an appropriate spot at the surface of the well, the three magnetic dipoles defining a center one of the dipoles as a guarded magnetic mark;
   moving the equipment on the wire line from and then back to the desired point; and
   sensing the guarded magnetic mark at the same approximate spot at the surface thereby indicating the arrival of the equipment at the desired point.

* * * * *